United States Patent [19]
Floyd et al.

[11] 3,869,042
[45] Mar. 4, 1975

[54] INSPECTING AND STACKING MACHINE FOR CONTAINERS

[76] Inventors: Wallace C. Floyd, 1110 S. 10th St., Arcadia, Calif. 91006; Gregory W. Holcomb, 1930 N. Cambridge, Orange, Calif. 92667

[22] Filed: Aug. 25, 1972

[21] Appl. No.: 283,746

[52] U.S. Cl.................... 198/267, 198/254, 214/6.5
[51] Int. Cl............................................. B65g 47/24
[58] Field of Search...73/45.2, 45.1, 45.3, 205 L; 221/173, 278, 159; 198/33 AA, 171, 198/33 T, 267–268, 254, DIG. 4; 214/6 FS, 6.5; 302/2 A

[56] References Cited
UNITED STATES PATENTS

| | | | |
|---|---|---|---|
| 2,309,231 | 1/1943 | Bagley | 73/45.3 |
| 2,352,916 | 7/1944 | Schrader | 73/45.3 |
| 3,285,387 | 11/1966 | Ochs | 198/33 AA |
| 3,349,619 | 10/1967 | Millar | 73/205 L |
| 3,351,388 | 11/1967 | Frank | 302/2 R |
| 3,389,811 | 6/1968 | Frank | 73/45.3 X |
| 3,392,816 | 7/1968 | Cox | 221/159 X |
| 3,472,556 | 10/1969 | Bolton | 198/171 X |
| 3,526,310 | 9/1970 | Gessmer, Jr. | 221/173 X |
| 3,623,598 | 11/1971 | Anfossi | 302/2 X |

FOREIGN PATENTS OR APPLICATIONS
1,016,134  1/1966  Great Britain.................... 214/6 FS Primary Examiner—Richard C. Queisser
Assistant Examiner—Daniel M. Yasich
Attorney, Agent, or Firm—Christie, Parker & Hale

[57] ABSTRACT

A machine for positioning, inspecting, and stacking open-topped containers includes an orientation station adapted to receive a supply of the containers one-by-one from a delivery source, such as a molding machine for making plastic containers. A laminar flow of air forced upwardly through the orientation station passes around and past each container to lift the containers and orient them in an upright position. Each upright container is then held in a fixed position as a movable inspection head is placed over its top. A suction is applied to the interior of the container through the inspection head to test the container for leaks. Leak-free containers are transferred by the head to a stacking station where the suction is removed to allow the containers to fall under gravity into a vertical stack. Leaky or otherwise defective containers are not transferred and stacked, but are passed to a separate collection station.

10 Claims, 8 Drawing Figures

INSPECTING AND STACKING MACHINE FOR CONTAINERS

BACKGROUND OF THE INVENTION

This invention relates to machines for handling and testing containers, and more particularly to a machine for orienting a supply of randomly positioned containers, testing the containers for leaks or other similar defects, and stacking the acceptable containers.

In recent years, containers have been made from hard plastic materials such as polyethylene, polyurethane, and polyvinyl chloride. These containers generally are manufactured in a molding machine which ejects a continuous stream of completed containers. In many instances, the plastic containers ejected from the molding machine are not suitable for commercial use. For example, the containers may have a crack or other deformity which would cause it to leak during use.

Generally speaking, hard plastic containers have an upper lip which is shaped to receive a cooperating lid to seal the contents of the container against air leaking in. The lip of the container sometimes is irregular when it comes from the molding machine, because of "flashing" of the plastic molding compound at the mold parting line. A lip seal with a slight irregularity is perfectly acceptable for commercial use, but a lip seal with a substantial irregularity, or one with a crack or hole in it, can prevent an air-tight seal from being formed when the lid is applied to the container, thereby promoting bacterial action in the contents of the container.

A variety of machines have been developed in the past for inspecting plastic containers for deformities such as leaks. A typical prior art inspection machine is disclosed in U.S. Pat. No. 3,389,811. A disadvantage of this type of machine is it cannot take randomly oriented containers and position them for inspection. Generally, the containers coming from the molding machine are randomly oriented and must be positioned in a certain preselected orientation by the inspection and/or stacking machine before they can be inspected and/or stacked.

Other prior art machines can position randomly oriented containers and stack them, but do not inspect them. Another disadvantage of prior art stacking machines is that they include relatively complex mechanisms for receiving each randomly positioned container coming from the molding machine and positioning the containers in a given orientation prior to stacking. Consequently, the prior art machines have a relatively high initial cost and are also relatively costly to maintain. Thus, many plastic container production plants dispense with using such machines, and the containers are gathered, inspected, and stacked by hand. The prior art stacking machines also are restricted to a relatively narrow range of sizes (i.e., the geometrical height-to-diameter ratio) of the containers which can be stacked. A further disadvantage is that prior art machines require manual handling of containers, which precludes sanitary inspection and packaging procedures.

SUMMARY OF THE INVENTION

This invention provides method and apparatus for orienting, inspecting, and stacking containers. The invention is especially useful in inspecting and stacking all bottom-heavy containers which are commercially available today, independently of their size and shape.

Briefly, the invention includes an orientation station for receiving a supply of such containers one-by-one from a delivery source. A laminar flow of gas is generated through the orientation station in a direction substantially opposed to that of normal gravitationall attraction so that the gas is forced up, around, and past each container admitted to the orientation station. The force of the gas flow lifts each container and the streamlining effect of the gas flow causes the container to be oriented in a substantially upright position with the orientation station.

The upward gas flow through the orientation station causes each container to quickly orient from a random position to an upright position before leaving the orientation station. This eliminates the need for costly, troublesome, and complicated prior art mechanisms for orienting the containers prior to inspection and/or stacking. Moreover, containers are oriented without regard to their shape or size.

In a preferred form of the invention, each upright-positioned container is inspected by an inspection head adapted to fit over the open top of the container. The inspection head is placed against the open top of the container as it is held in its upright position, and a suction is then momentarily applied to the interior of the container through the inspection head. The suction holds a leak-free container snugly against the inspection head, which is adapted to move the leak-free container to a stacking station where the suction is then removed to allow the container to fall under gravity into a stack of acceptable containers.

BRIEF DESCRIPTION OF THE DRAWINGS

These and other aspects of the invention will be more fully understood by referring to the following detailed description and the accompanying drawings in which.

DETAILED DESCRIPTION OF THE PREFERRED EMBODIMENTS

Figure 1:
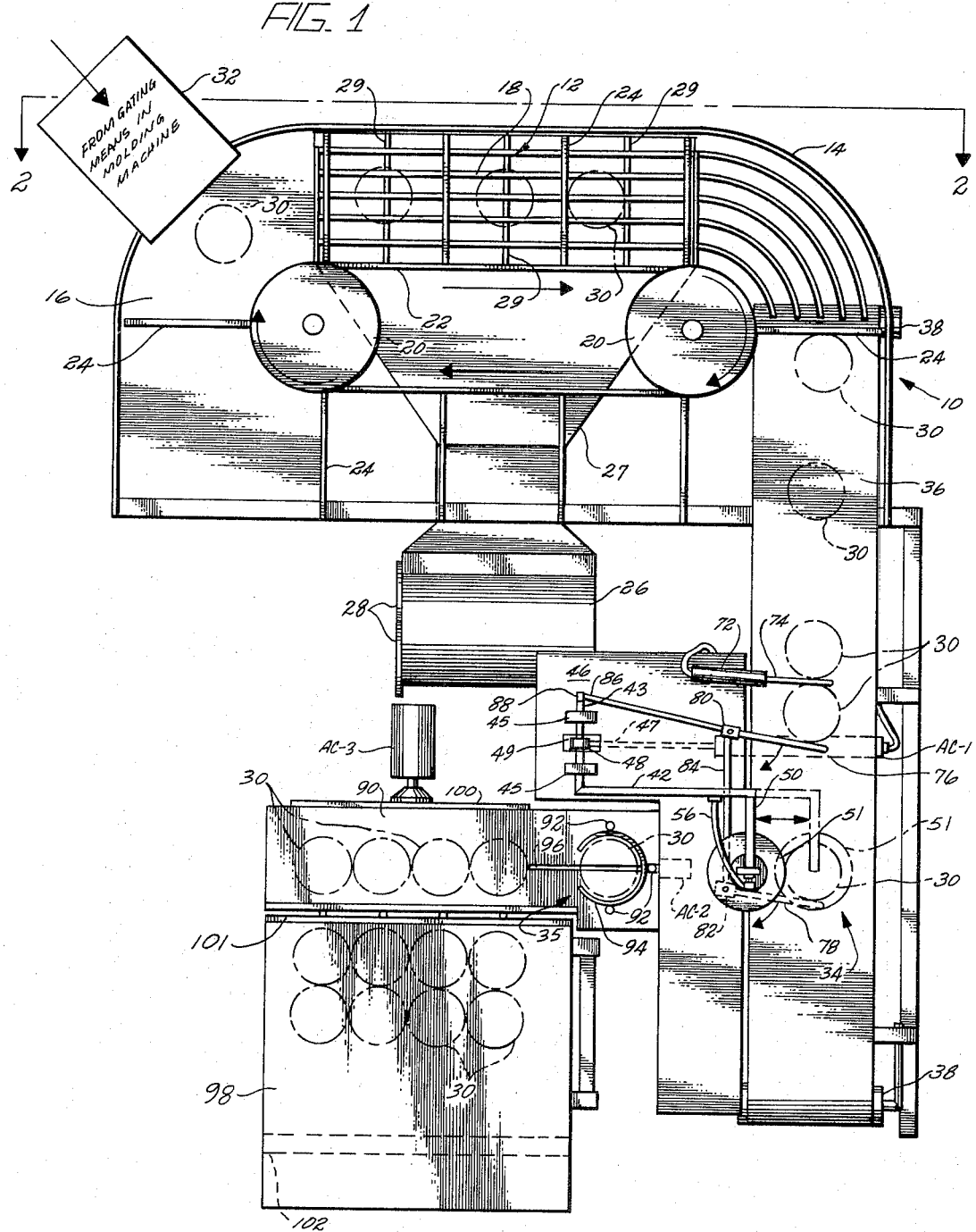
FIG. 1 is a fragmentary plan elevation view showing a container orientation, inspection, and stacking machine embodying this invention.
Figure 2:
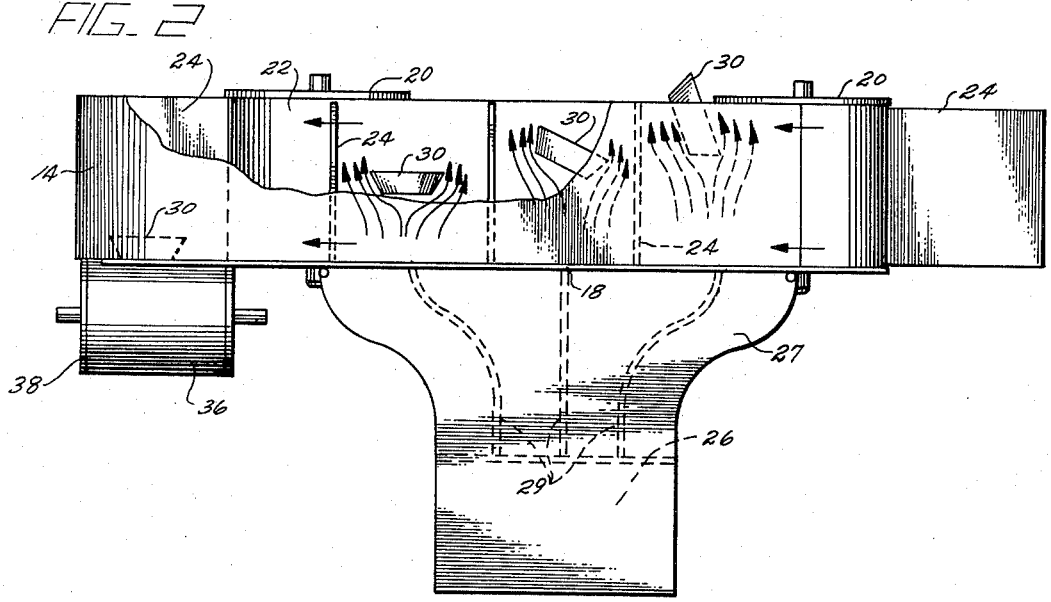
FIG. 2 is an elevation view, partly broken away, taken on line 2—2 of FIG. 1.

Referring to FIGS. 1 and 2, a container orientation, inspection, and stacking machine 10 includes a substantially U-shaped orientation track 12 having an upright wall 14 bounding its outer edge. A flat horizontal plate 16 forms a bottom for the front portion of the track, and a wire grid 18 forms the bottom of the remaining portion of the track.

The inner edge of orientation track 12 is bounded by a paddle wheel mechanism for dividing the track into a series of adjacent moving compartments. The paddle wheel mechanism includes a pair of longitudinally spaced apart upright drums 20 positioned at opposite ends of track 12, and an upright endless belt 22 wrapped around the drums. Preferably, belt 22 is made of a rugged material such as canvas. At least one of the drums is coupled to suitable drive means (not shown) for rotating the drums to move belt 22 longitudinally relative to the orientation track. A series of longitudinally spaced apart, upright dividing fins 24 are rigidly secured to the belt so the fins are maintained in a position substantially perpendicular to the plane of the belt as the belt is driven by the drums.

Preferably, orientation track 12 is mounted above the floor of the production plant on an upright framework. A blower 26 is mounted on the floor below the level of the track 12, and an elongated air duct 27 opens upwardly below wire grid 18 to channel air from the blower in an upward direction through the wire grid. Preferably, the opening in the air duct is rectangular in shape and matches the rectangular area traversed by the straight portion of the wire grid shown in FIG. 1. Louvers 28 at the side of the blower are adjustable to control the flow rate of air forced through the wire grid. A set of adjustable vanes 29 mounted in duct 27 adjust the desired laminar flow of air through the grid and distribute air flow evenly.

In use, the vertical air flow orients randomly positioned containers 30 in an upright position before the containers leave the orientation track. The containers enter the first portion of track 12 from an inclined chute 32 leading from a molding machine (not shown) or other delivery source. The dividing fins cooperate with outer panel 14 and belt 22 to form a series of moving compartments which urge the containers to move lengthwise along track 12. Preferably, a gate in the chute, or in the molding machine outlet, is cycled in timed relation with the speed of belt 22 to open and allow passage of one container for each compartment.

Preferably, containers 30 are made of a relatively lightweight material such as polyethylene, polyurethane, or polyvinyl chloride. The containers are open at the top and therefore are bottom-heavy. We have discovered that when air flowing from blower 26 up through the bottom of wire grid 18 is controlled to flow at a certain rate, depending upon the weight of the container, randomly oriented bottom-heavy containers entering orientation track 12 are lifted slightly by the air flow and caused to float to an upright position. The streamlining effect of the laminar air flow passing up, around, and past each container, as illustrated in FIG. 2, causes each container to become oriented with its top facing up and its bottom resting on the end of track 12 as it leaves the orientation track. The air flow rate through the orientation track is adjusted at least to a level sufficient to lift the containers so they can be oriented by the streamlining effect of the air. The flow rate also is adjusted to a level below that which would blow the containers out of the compartment. The moving fins 24 urge the containers along the track, and each container is oriented in an upright position by the time it reaches the end of the orientation track.

Upright-positioned containers exiting orientation track 12 are transferred to an inspection station 34 and stacking station 35 by an elongated horizontally disposed endless conveyor belt 36. The belt is engaged with a pair of longitudinally spaced apart drums 38, one of which is driven by a conveyor drive motor (not shown).

Figure 3:
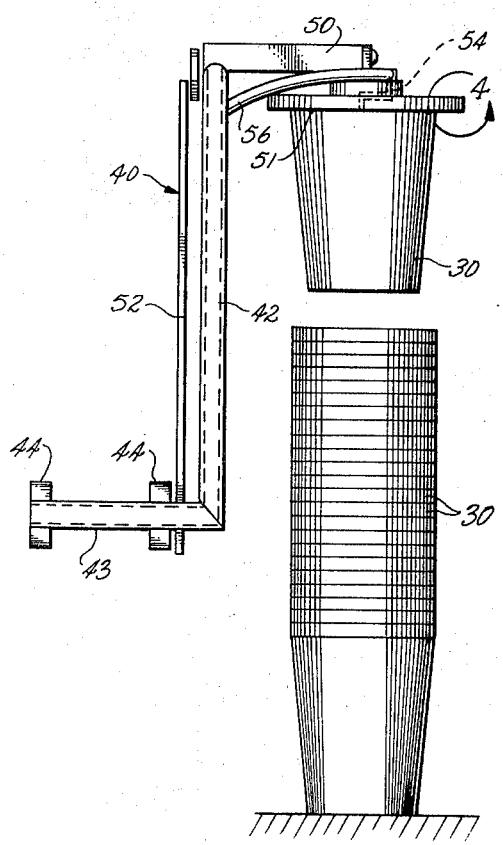
FIG. 3 is a schematic elevation view showing the inspection head and pick-up arm mechanism in the machine of FIG. 1.
Figure 4:
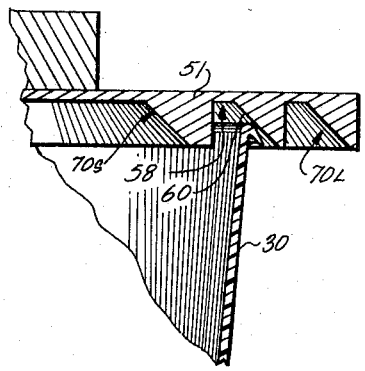
FIG. 4 is an enlarged sectional elevation view of the portion of the inspection head shown within the circle 4 of FIG. 3.

Inspection station 34 includes a container pick-up mechanism 40 shown best in FIGS. 3 and 4. The pick-up mechanism includes an elongated tubular pick-up arm 42 and a tubular drive arm 43 extending at a right angle to pick-up arm 42. Drive arm 43 pivots about a horizontal axis centered in bearings 44 mounted in bearing blocks 45 (see FIG. 1). As the drive arm pivots, pick-up arm 42 moves from an upright position shown in FIG. 3 to an angular position over conveyor belt 36. The bearing blocks 45 are mounted on a base 46 (see FIG. 1) adjacent the conveyor belt, and drive arm 43 is rotated by reciprocating movement of a piston rod 47 in an air cylinder AC-1 under the base. The piston rod is connected to a crank arm 48 rigidly connected to drive arm 43 and extending downwardly through a slotted opening 49 in base 46.

A horizontally disposed support arm 50 extends outwardly from the top of pick-up arm 42 in a direction opposed to that of drive arm 43. The support arm carries a flat, circular vacuum disk or inspection head 51. The disk is mounted on the end of arm 50 by a swivel (not shown) which allows the disk to rotate relative to arm 50 so the disk is maintained in a substantially horizontal plane as pick-up arm 42 pivots between its upright position and its position over the conveyor belt. A pivotally mounted parallel linkage 52 stabilizes movement of the disk to substantially prevent it from oscillating at the end of its travel.

Figure 6:
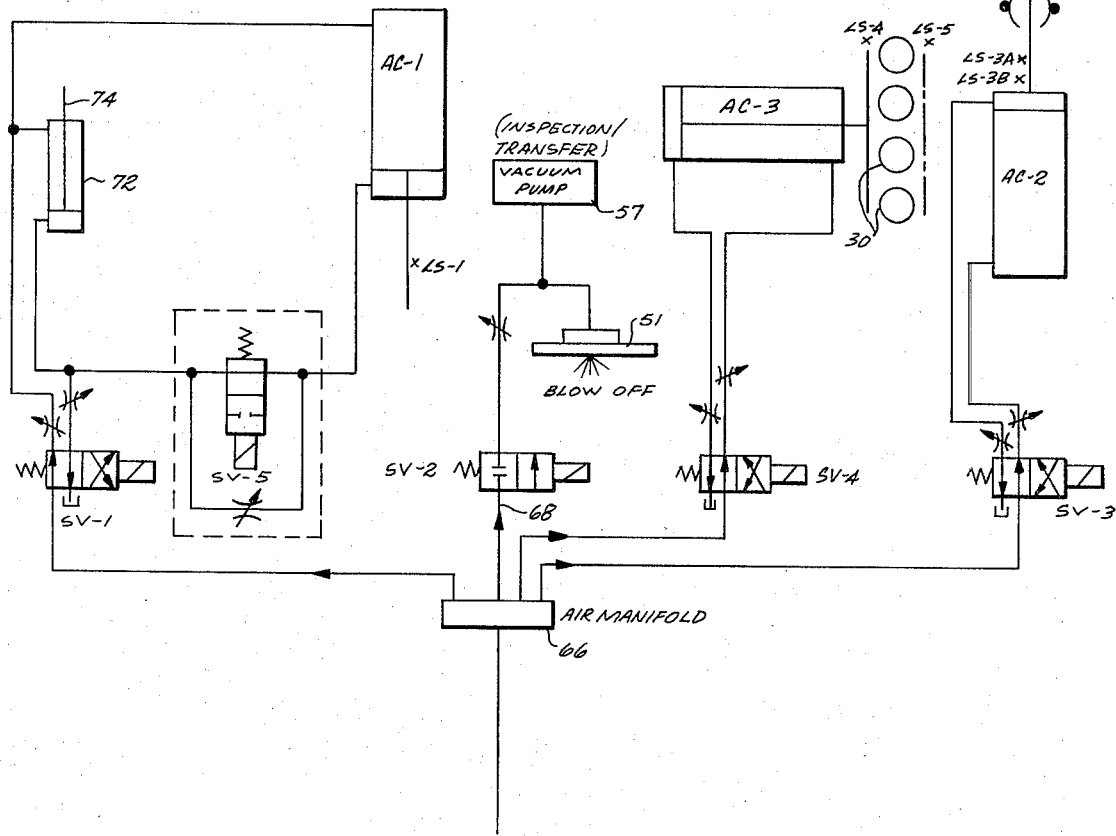
FIG. 6 is a schematic diagram of the pneumatic control system for operating the machine shown in FIG. 1.

An air passage 54 extends through disk 51, and is connected with a tubular vacuum line 56 which extends through the interior of tubular pick-up arm 42 to a vacuum pump 57 (see FIG. 6).

As shown best in FIG. 4, an annular slot 58 is formed in the undersurface of disk 51. An angular outer edge 60 of the slot tapers narrower toward the top of the slot. In use, pick-up arm 42 alternately pivots to move disk 51 to a preselected position (shown in phantom line in FIG. 1) over the conveyor belt where the disk is placed against the open top seal lip of each container carried by the belt. Annular slot 58 is sized to match the diameter of the seal lip of the container so the top of the container becomes seated in the slot. A vacuum is then drawn on the interior of the container through the disk by vacuum pump 57. The vacuum drawn on the interior of each container provides means for inspecting the containers for leaks. If the container has no flaws, such as cracks or irregularities from an incomplete mold fill "short," the suction allows the container to be raised by the disk and pick-up arm, which then pivots up toward container stacking station 35. The tapered edge 60 of slot 58 makes it possible for the disk to pick up containers having slight irregularities in the top of lip seal caused by flashing of the molding compound at the mold parting line. A flat disk would reject such containers, even though they are commercially acceptable.

When the pick-up arm reaches its full upright position (shown in FIG. 3) the container is held over the stacking station 35. The container is then ejected from the disk by a short blast of air forced through vacuum line 56 from a central air supply admitted from an air manifold 66 (see FIG. 6) through an air line 68 (see FIG. 6) connected to the disk. After the container is released it falls into a vertical stack below the disk. The pick-up arm then pivots down toward inspection station 34 so the disk can inspect the next container.

A second annular slot concentric with slot 58 and identical in shape to slot 58 is formed in the undersurface of the disk adjacent the outer edge of slot 58. A circular angular shoulder 70S concentric with slot 58 is formed in the underside of disk 51 adjacent the inner edge of slot 58. Slot 70L is obviously to allow disk 51 to pick up containers of a larger size, and shoulder 70S is for containers of a smaller size. Moreover, the disk is releasably attached to the end of support arm 50, so the disk can be replaced with other disks having annular slots of different sizes to inspect different sized containers.

Referring again to FIG. 1, the movement of the containers on conveyor belt 36 toward inspection station 34 is cycled with movement of pick-up arm 42 and inspection head 51 so that each succeeding container is momentarily held in a fixed position to receive the cycling inspection head as it pivots toward the conveyor belt from stacking station 35. The cooperating movement of the containers and the pick-up arm assembly can be accomplished by a variety of methods. Preferably, this is done by a gating system which includes an air-operated gate cylinder 72 mounted on base 46 adjacent to one edge of the conveyor belt. The gate cylinder has an extendable and contractable piston arm 74 adapted to extend out over the conveyor belt 36 to interrupt moving containers thereon and stop them momentarily until the arm is instructed to retract.

The gating system also includes a pair of longitudinally spaced apart swinging gate arms 76 and 78 disposed adjacent to the edge of the conveyor belt and located downstream from gate cylinder 72. The gate arms extend out over the path of a conveyor belt and are connected to respective pivotally mounted cranks 80 and 82. An elongated rod 84 disposed adjacent to the edge of the conveyor belt and extending lengthwise relative to the belt connects the two cranks together so the two gate arms alternately extend over the belt and pivot away therefrom as one of the cranks is rotated about its pivot pair. Preferably, the gate arms are operated by movement of air cylinder AC-1 so they move in unison with movement of pick-up arm 42. A transverse rod 86 having one end connected to crank 80 is connected at its opposite end to a crank 88 secured to the end of drive arm 43 of the pick-up arm. Thus, rotation of drive arm 43 causes rod 86 to reciprocate, which in turn pivots crank 80 to swing gate arms 76 and 78 back and forth from a position blocking containers to a position allowing them to pass. The gate arms are cycled with movement of the pick-up arm so that the gate arms pivot outwardly to block passage of containers as the pick-up arm moves the inspection head toward the plane of the conveyor belt.

In use, as the pick-up arm is raised toward container stacking station 35, gate cylinder 72 extends to momentarily stop the next container. The gate arms 76 and 78 at this time swing away from the conveyor belt (in the direction of the arrows shown in FIG. 1) to allow a previously held container to pass toward the inspection station. After the pick-up arm and inspection head pivot back from the stacking station, the gate arms swing back over the conveyor belt so arm 78 can stop the previously bypassed container and hold it in a position for inspection. Gate cylinder arm 74 then retracts, allowing the next container to pass to gate arm 76 which holds the container momentarily while the inspection head is being placed over the top of the previously bypassed container. The gate cylinder arm 74 then extends to stop the next container, and the pick-up arm is then raised, which in turn causes the gate arms to swing away from the conveyor belt allowing the container held by arm 76 to pass toward the inspection station. This procedure is continuously repeated until a desired number of the containers are inspected and stacked. If a container is rejected by inspection head 51, gate arm 78 swings aside and the rejected container passes along conveyor belt 36 and drops off the end of the conveyor into a "rejects" box (not shown).

Containers stacked at stacking station 35 rest at the edge of a flat base 90. The containers are dropped through a vertical chute disposed above base 90, the chute being formed by three radially spaced apart vertical, wire guide rods 92 secured at their bottoms to a C-shaped resilient spring clamp 94 having its opening facing toward the major portion of the base 90. A reciprocating piston arm of an air cylinder AC-2 is connected to clamp 94 to move the clamp back and forth relative to base 90. Air cylinder AC-2 is located below base 46, and a link (not shown) extending from the air cylinder piston rod to clamp 94 slides in an elongated slot 96 in base 90 as the air cylinder piston rod reciprocates.

The clamp and rods hold the stack of containers in a fixed upright position as they accumulate. After a fixed number of containers are stacked, air cylinder AC-2 is actuated to transfer the clamp and container stack lengthwise on base 90 away from stacking station 35. The clamp and guide rods are then returned to the stacking station to gather a new stack of containers. The fingers of the clamp are very resilient so they spread apart easily as the clamp is retracted from the stack of containers.

The stack is transferred the distance of one space at a time on base 90. If other stacks already are present on the base, they are pushed over one space by the stack being transferred. After a complete row of stacked containers is accumulated on base 90, the entire row is transferred in unison to an adjacent horizontally disposed stacking deck 98. The row of stacked containers is transferred by an upright pusher plate 100 adjacent base 90 which is moved back and forth by an extendable and contractable piston rod of an air cylinder AC-3. The row of stacked containers move over an upwardly projecting, spring biased, pivotal guide wall 101 between base 90 and deck 98. The movement of containers over the guide wall causes the guide wall to pivot down momentarily, and pivot back up after passage of the containers to provide guide means for keeping the containers on deck 98 aligned in straight rows. Stacking deck 98 tilts manually about a transverse axis 102. Thus, after the deck is filled with stacks of containers, a box (not shown) can be placed over the array of containers, and the deck tilted to transfer the containers top-side-down into the box.

Figure 5:
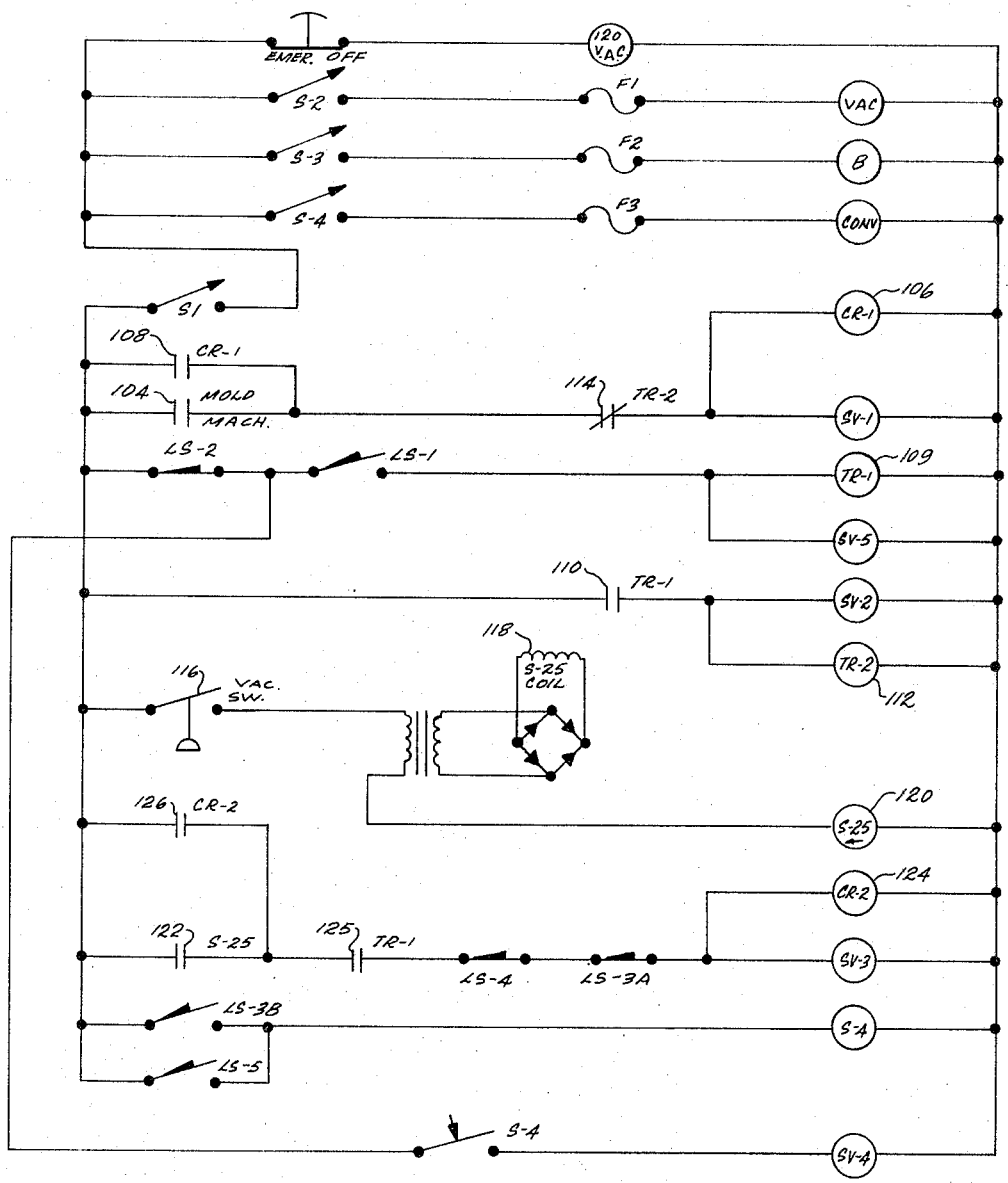
FIG. 5 is an electrical schematic diagram of a preferred control circuit for operating the machine shown in FIG. 1.

The sequence of operations for the inspection and stacking machine of FIG. 1 is understood best by referring to FIGS. 5 and 6. The operator of the machine first closes a toggle switch S-1 to energize the control circuit. A set of toggle switches S-2, S-3, and S-4 are then closed to operate vacuum pump 64, blower 26, and the conveyor drive motor, respectively. The conveyor drive motor operates both conveyor belt 36 and paddle wheel belt 22.

The inspection and stacking machine is cycled and timed with the gate in molding machine through a set of contacts 104. When these contacts are closed, a coil 106 of a control relay CR-1 is energized to close a set of normally open holding contacts 108 to lock the relay in an energized condition. This energizes a solenoid valve SV-1 to pressurize air cylinder AC-1 to move its piston rod and raise pick-up arm 42.

When pick-up arm 42 reaches the top of its travel it closes a normally open limit switch LS-1 which actuates a coil 109 of a delay timer relay TR-1. After the timer relay times out, it closes a set of normally open contacts 110 to supply power to a solenoid valve SV-2 which momentarily pressurizes vacuum line 56 to blow off a container from the inspection head into the vertical stack below it. The delay provided by the timer relay allows the inspection head to stop rocking before the container is blown off. The closing of timer relay contacts 110 also energizes a coil 112 of a second timer relay TR-2. When timer TR-2 times out, it opens a set of normally closed contacts 114 which cut off power to coil 106 of control relay CR-1 and de-energize solenoid valve SV-1, allowing the pick-up arm to return to a waiting container. As solenoid valve SV-1 becomes de-energized, it also causes the piston arm 74 of gate cylinder 72 to retract to allow passage of a succeeding container.

A vacuum switch 116 senses all acceptable containers stacked by the inspection head. As a vacuum is drawn inside a leak-free or otherwise flawless container, vacuum switch 116 is closed, which energizes a coil 118 of a stepping switch S-25, thereby counting an acceptable container. If a leaky container is present, the inspection head will not pick it up and no vacuum will be drawn. Thus, stepping switch 118 will not count the rejected container. As the stepping switch reaches a predetermined number of containers to be stacked, say 25 containers, it triggers a relay coil 120 to close its normally open contacts 122, which energizes a coil 124 of a control relay CR-2 and also energizes a solenoid valve SV-3 through a set of contacts 125 of timer relay TR-1 which are closed at the time. When control relay CR-2 is energized it closes a set of normally open contacts 126 to momentarily lock solenoid valve SV-3 in an energized condition. Solenoid valve SV-3 is operated to actuate air cylinder AC-2 which moves a stack of containers away from the stacking station so that a new stack can be accumulated. As air cylinder AC-2 moves the stack away from the stacking station it opens a normally closed fail-safe limit switch LS-2 to prevent a solenoid valve SV-4 from being energized which would otherwise actuate air cylinder AC-3 and cause a collision with air cylinder AC-2. When air cylinder AC-2 reaches the end of its travel, it opens a normally closed limit switch LS-3A to cut off power to control relay CR-2 and solenoid valve SV-3, allowing air cylinder AC-2 to return.

A second limit switch LS-3B, which is normally open, is closed by movement of air cylinder AC-2 to its full travel, and when limit switch LS-3B is closed, it energizes a solenoid S-4 which is a stepping switch that counts the stacks of containers. After a predetermined number of stacks have been counted by switch S-4, say four stacks of cups, the switch energizes solenoid valve SV-4, which actuates air cylinder AC-3 to move the stacks of cups onto deck 98. As air cylinder AC-3 moves out it breaks contacts on a fail-safe limit switch LS-4 so that power is cut off to solenoid valve SV-3 so that it will not energize air cylinder AC-2 and cause it to collide with air cylinder AC-3. When air cylinder AC-3 reaches the end of its travel it energizes switch S-4 again, by closing the contacts of a limit switch LS-5, thereby causing power to be cut off to solenoid valve SV-4, allowing air cylinder AC-3 to return for another load.

When limit switch LS-1 is closed to actuate timer TR-1, it also energizes a solenoid valve SV-5 in a damper circuit which controls movement of the pick-up arm. Solenoid valve SV-5 restricts the exhaust on solenoid valve SV-1 to slow down the speed of the pick-up arm near the top of its travel to keep the arm from bottoming out and thereby jarring a container off the inspection head.

Alternate embodiments of the inspection head and pick-up arm assembly shown in FIGS. 1 through 4 can be used without departing from the scope of the invention. For example, the inspection head can be adapted to swing through an arc of 180° in a horizontal plane of movement. The head can be cycled to move over each container on the conveyor belt and then move the container away from the conveyor belt to a stacking station. Moreover, several inspection heads can be cycled with respect to each other to alternately inspect the containers moving along the conveyor belt and stack the acceptable containers.

Figure 8:
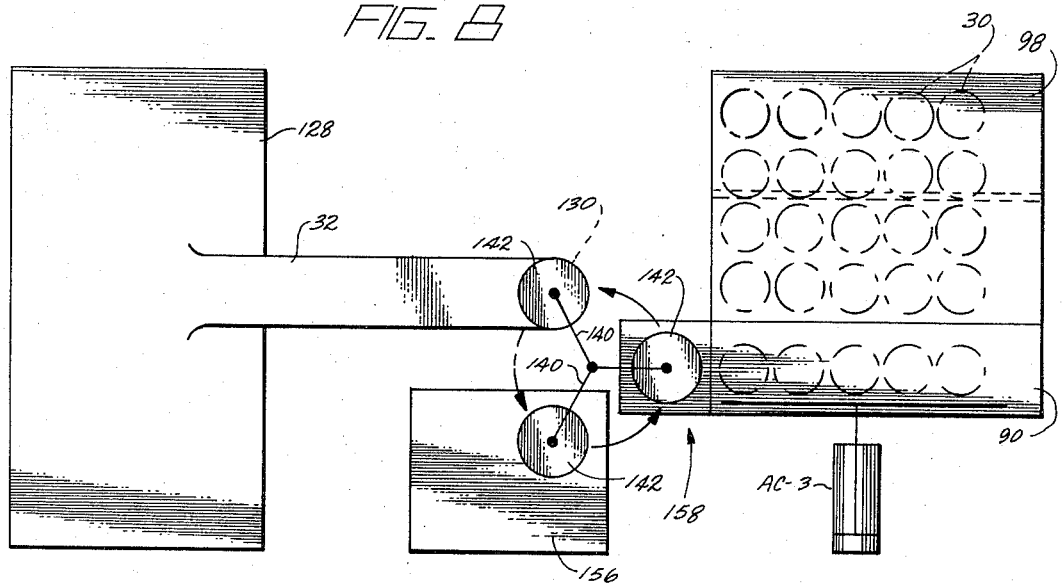
FIG. 8 is a schematic plan elevation view taken on line 8—8 of FIG. 7.
Figure 7:
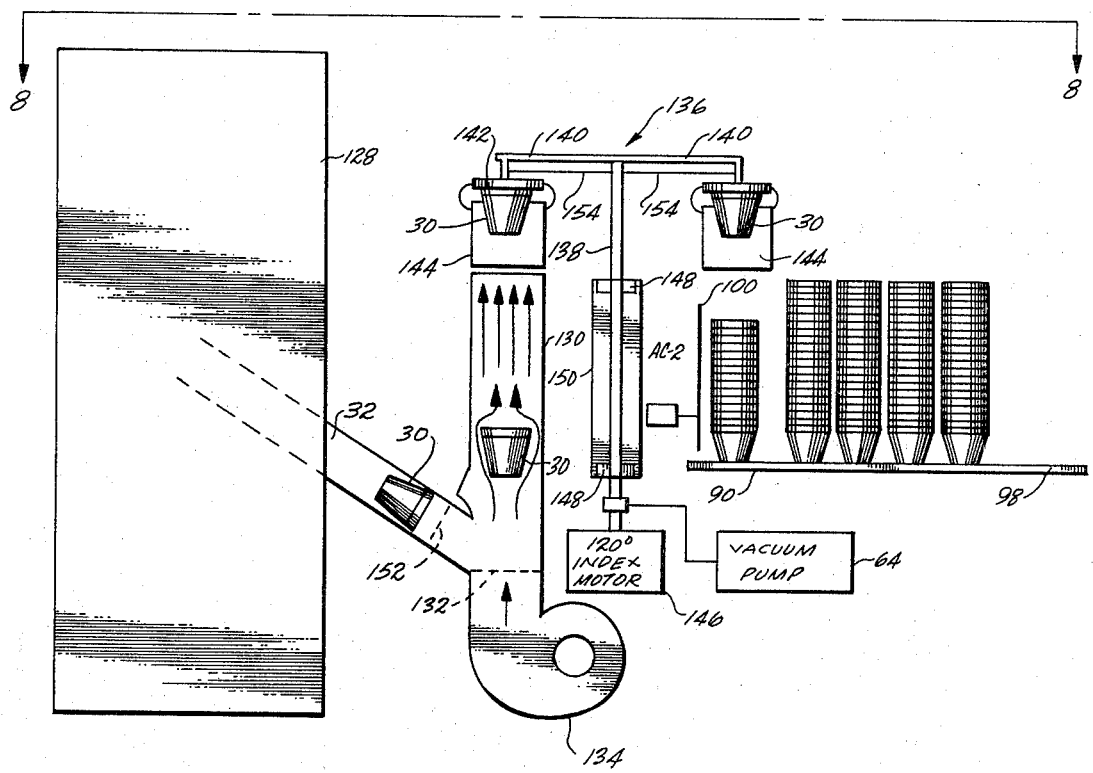
FIG. 7 is a schematic elevation view showing an alternate container orientation, inspection, and stacking machine embodying this invention.

FIGS. 7 and 8 show a alternate form of the invention, in which containers ejected down chute 32 from a molding machine 128, or other delivery source, enter a vertically disposed tubular orientation duct 130. A wire grid 132 provides a bottom for the duct, and a blower 134 below the grid forces air up through the duct. Containers entering the duct become oriented in an upright position almost immediately, and are then forced up through the duct by the upward flow of air.

A rotatable inspection and stacking assembly 136 is mounted adjacent to the duct. The assembly includes a vertically extending rotatable tubular rod 138, and three horizontally disposed support arms 140 extending radially outwardly from the top of the rod at 120° angles with respect to each other. Each rod carries a separate vacuum disk or inspection head 142 identical in construction to disk 51. A separate tubular skirt 144 extends down from each disk, each skirt being the same diameter as that of the duct. The vertical rod is coupled to a 120° indexing motor 146 which rotates the rod about its axis to move each disk and skirt combination in succession over the top of duct 130. Rod 138 is journaled in bearings 148 mounted in the top and bottom of an elongated sleeve 150 through which the rod extends.

When a disk is placed over the top of the duct, the bottom edge of its skirt 144 is spaced a very short distance above the top of duct 130. The rotational movement of disks 142 is cycled with respect to passage of containers up through the duct, so that a separate inspection head covers the top of the duct as each container reaches its top. This cycling is provided, in part, by a gate 152 in chute 32, or in the molding machine, which opens to allow entry of one container at a preselected time with respect to the position of the disk assigned to inspect the container, so the disk reaches the top of the duct shortly ahead of the container.

The air forced up through the duct causes each container to come to rest against the bottom of the disk. A vacuum is then drawn on the interior of the container through a vacuum line 154 to inspect the container for leaks or other defects.

As shown best in FIG. 8, indexing motor 146 rotates each inspection head between the inspection station over duct 130, a reject station 156, and a stacking station 158 substantially identical to stacking station 35. The inspection heads are held momentarily in each station simultaneously. After each inspection head tests a container, if the container has a flaw, the movement of the inspection head away from the inspection station carries the container with it and drops it into a suitable receptacle at reject station 156. Each leak-free container is moved to the stacking station during the next cycle, and is forced down into a stack below it by a short blast of air.

Thus, the machine provides a simple but highly effective orientation system for positioning randomly oriented containers coming from a delivery source, and inspects the pre-positioned containers and stacks them in a manner ready for being packaged for delivery to the consumer.

We claim:

1. Apparatus for orienting a supply of randomly positioned, tapered, bottom-heavy containers coming from a delivery source, the apparatus comprising:

an orientation station for receiving and orienting said randomly-positioned containers, the orientation station including an elongated support surface for confining downward movement of the containers to be moved along the length of the support surface, a gas supply and means for directing the flow of gas from the gas supply to the underside of said support surface, the support surface having spaced apart openings to allow the gas to flow upwardly through it, means forming a series of spaced apart compartments movable above the support surface and along the length thereof from a front portion of the orientation station in the vicinity of the delivery source to an end portion of the orientation station so that containers admitted to the compartment means from the delivery source can be moved by the compartment means along the support surface, each compartment means forming an enclosure extending around a given randomly-positioned container coming from the delivery source, each enclosure being open at its bottom and at its top so that gas from the gas supply can flow upwardly through the enclosure, and means generating a laminar flow of the gas through the support surface and the movable compartment means being in a direction substantially opposed to that of normal gravitational attraction and at an adjustable sufficient flow rate that the gas flows upwardly against substantially the entire randomly-positioned, downwardly-facing surface area of each container, and around, and past each container and so that the gas flow will orient each container in a substantially upright position within its respective compartment means, the moving compartment means cooperating with the gas flow to transfer the containers toward the end portion of the orientation station as the containers are being oriented by the laminar gas flow so that the containers are oriented in an upright position within their respective compartment means when they reach the end of the orientation station.

2. Apparatus according to claim 1 including conduit means connected between the gas supply and the underside of the support surface for directing the flow of gas along the length of the support surface.

3. Apparatus according to claim 1 including means for adjusting the flow rate of the gas flow through the support surface and the compartment means.

4. Apparatus according to claim 1 including means for adjusting the speed of movement of the series of compartment means.

5. Apparatus according to claim 4 in which the delivery source periodically feeds a randomly-positioned container to the orientation station, and including gating means operative in timed relation with the speed of the compartment means for admitting one container from the delivery source to each compartment means.

6. Apparatus for orienting a supply of randomly-positioned, tapered, bottom-heavy containers, the apparatus comprising:

an orientation station for receiving and orienting a supply of said randomly-positioned containers fed from a delivery source, the orientation station including an elongated support surface for confining downward movement of the containers to be moved along the length of the support surface, conduit means connected to a gas supply and to the underside of said support surface, the support surface having grid openings in it to allow the gas to flow upwardly through it, means forming a series of spaced apart compartments movable above the support surface and along the length thereof from a front portion of the orientation station in the vicinity of the delivery source to an end portion of the orientation station so that containers admitted to the compartment means from the delivery source can be moved by the compartment means along the support surface, each compartment means forming an enclosure around the outer periphery of each randomly-positioned container, the enclosure being open at its bottom and its top so that gas can flow in a stream upwardly through the enclosure, with the enclosure being able to confine lateral movement of the container, gating means operative in timed relation with movement of the compartment means for admitting one container from the delivery source to each enclosure of the compartment means, and means generating a laminar flow of the gas through the support surface and the movable compartment means being in a direction substantially opposed to that of normal gravitational attraction and at such a flow rate that the gas flows upwardly against substantially the entire randomly-positioned, downwardly-facing surface area of each container, and around, and past each container and so the gas flow will orient each container in a substantially upright position with its respective compartment means, the moving compartment means cooperating with the gas flow to transfer the containers toward the end portion of the orientation station as the containers are being oriented by the gas flow so that the containers are oriented in an upright position within their respective compartment means when they reach the end of the orientation station.

7. Apparatus according to claim 6 including means for adjusting the flow rate of the gas flow through the support surface and the compartment means.

8. Apparatus according to claim 6 including means for adjusting the speed of movement of the compartment means to match the cycling time of the gating means.

9. A method of orienting a supply of randomly-positioned, tapered, bottom-heavy containers being fed periodically from a delivery source to an elongated orientation station, the method comprising the steps of:

moving a series of spaced apart compartment means, each of which is open at its bottom and at its top, above and along the length of a support surface which extends from a front portion of the orientation station in the vicinity of the delivery source to an end portion of the orientation station, the support surface confining downward movement of the containers to be moved along the length of the support surface, admitting a given container from the delivery source to each compartment means, and directing an adjustable flow of gas from a gas supply to the underside of said support surface to produce a laminar gas flow upwardly through spaced apart openings in the support surface and through the compartment means above the support surface, the laminar gas flow being in a direction substantially opposed to that of normal gravitational attraction and at such a flow rate that the gas flows upwardly against substantially the entire randomly-positioned, downwardly-facing surface area of each container, and around, and past each container, the laminar gas flow cooperating with the moving compartment means to orient each container in a substantially upright position within its respective compartment means while concurrently moving each container toward the end portion of the orientation station so that the containers will be oriented into an upringht position when they reach the end of the orientation station.

10. The method according to claim 9 including concurrently moving the compartment means in timed relation with the periodic cycling of the delivery source to admit one container to each moving compartment means.

* * * * *